United States Patent [19]
Austin et al.

[11] Patent Number: 5,925,610
[45] Date of Patent: Jul. 20, 1999

[54] MULTIFUNCTIONAL MALEATE POLYMERS

[75] Inventors: Anne-Marie B. Austin, Signal Mountain; Allen M. Carrier, Hixson, both of Tenn.; Michael L. Standish, Rossville, Ga.; James H. Belcher, deceased, late of Chattanooga, Tenn., by Theodore P. Betts, executor

[73] Assignee: National Starch and Chemical Investment Holding Corporation, Wilmington, Del.

[21] Appl. No.: 08/322,658

[22] Filed: Oct. 12, 1994

Related U.S. Application Data

[63] Continuation-in-part of application No. 08/009,164, Jan. 26, 1993, abandoned.

[51] Int. Cl.$^6$ .................................. C11D 3/37; C11D 3/10
[52] U.S. Cl. .......................... 510/361; 510/476; 510/509
[58] Field of Search ........................ 252/174.24, 174.23, 252/DIG. 2, 174.14, 174.05; 510/361, 476, 533, 509

[56] References Cited

U.S. PATENT DOCUMENTS

| | | | |
|---|---|---|---|
| 2,971,939 | 2/1961 | Baer | 525/285 |
| 3,635,915 | 1/1972 | Gale | 524/811 |
| 3,887,480 | 6/1975 | Rue et al. | 252/135 |
| 4,314,044 | 2/1982 | Hughes et al. | 524/808 |
| 4,486,581 | 12/1984 | Walinsky | 526/271 |
| 4,519,920 | 5/1985 | Fukumoto | 210/701 |
| 4,559,159 | 12/1985 | Denzinger et al. | 252/174.24 |
| 4,586,962 | 5/1986 | Barabas | 134/4 |
| 4,647,396 | 3/1987 | Denzinger et al. | 252/174.24 |
| 4,659,793 | 4/1987 | Yang | 526/91 |
| 4,663,071 | 5/1987 | Bush et al. | 252/174.19 |
| 4,666,609 | 5/1987 | Tsuneki et al. | 210/701 |
| 4,668,735 | 5/1987 | Fukumoto et al. | 524/804 |
| 4,710,537 | 12/1987 | Walinsky | 524/549 |
| 4,906,397 | 3/1990 | Leighton et al. | 252/174.24 |
| 4,952,324 | 8/1990 | McDonald et al. | 210/697 |
| 5,021,525 | 6/1991 | Montague et al. | 526/210 |
| 5,055,540 | 10/1991 | Hughes et al. | 526/318.2 |
| 5,064,563 | 11/1991 | Yamaguchi et al. | 252/174.23 |
| 5,073,269 | 12/1991 | Denzinger et al. | 210/698 |
| 5,135,677 | 8/1992 | Yamaguchi et al. | 252/180 |
| 5,149,455 | 9/1992 | Jacobs et al. | 252/174.13 |
| 5,160,657 | 11/1992 | Bortolotti et al. | 252/174.14 |
| 5,164,108 | 11/1992 | Appel et al. | 252/174 |
| 5,175,361 | 12/1992 | Denzinger et al. | 562/590 |
| 5,244,988 | 9/1993 | Hughes et al. | 526/93 |

FOREIGN PATENT DOCUMENTS

| | | |
|---|---|---|
| 1277088 | 11/1990 | Canada . |
| 25 551 | 3/1981 | European Pat. Off. . |
| 59-68563 | 4/1984 | Japan . |
| WO 94/15978 | 7/1994 | WIPO . |

*Primary Examiner*—Ardith Hertzog
*Attorney, Agent, or Firm*—John D. Thallemer

[57] ABSTRACT

Maleate copolymers comprise less than 1% residual total free monomer and have a weight average molecular weight of 1,000 to 4,000. The copolymer comprises at least 50 mole percent maleate, 10 to 50 mole percent acrylate monomer and 1 to 10 mole percent of at least one non-ionic comonomer. The copolymers are useful in inhibiting deposition of water hardness ions, in detergents and as dispersants in aqueous slurries. Copolymers are prepared by an aqueous solution polymerization process, comprising the steps of initially neutralizing at least 70%, on a molar basis, of the charge of a maleate monomer, followed by the slow addition of at least one polymerizable comonomer, together with an oxidative free radical initiator and a suitable metallic ion reductant, for synthesis over at least a three hour period at 80 to 100° C., followed by the addition of more initiator.

6 Claims, 2 Drawing Sheets

MULTIFUNCTIONAL MALEATE POLYMERS

This application is a continuation-in-part of application Ser. No. 08/009,164, filed Jan. 26, 1993 now abandoned.

FIELD OF THE INVENTION

This invention relates to copolymers of maleic acid having unique functional properties that are prepared by an aqueous solution process to yield a copolymer comprising at least 50 mole percent maleate and less than 1%, on a copolymer weight basis, residual free monomer. The process used to prepare this copolymer is carried out in the presence of a redox catalyst system, comprising at least one initiator and appropriate metallic ions, with slow feed addition of the comonomer(s), together with the post-addition of initiator. The maleate copolymers are useful in a variety of applications requiring modification of salt crystal formation in aqueous solution.

BACKGROUND OF THE INVENTION

It is known that maleic acid in aqueous solutions does not readily form homopolymers, but will quite rapidly copolymerize with various other ethylenically unsaturated monomers, typically to form 1:1 molar ratio maleate-:comonomer copolymers.

In most cases, maleate copolymers are prepared by a solution polymerization process employing organic solvents. For example, U.S. Pat. No. 4,710,537, issued Dec. 1, 1987 to Walinsky, teaches the preparation of a substantially homogeneous copolymer, consisting essentially of 35 to 65 mole percent acrylate and 65 to 35 mole percent maleate units and having a number average molecular weight of about 500 to 5,000. The copolymer is prepared in a chain-transfer solvent, preferably a ketone, ester, or ether having from 4 to 10 carbon atoms. Following polymerization, an aqueous solution of the copolymer may be prepared by adding water to the polymerization flask and distilling off the organic solvent.

For reasons of safety, efficiency in manufacturing and waste handling, it is desirable to polymerize the maleate copolymers in aqueous solution, rather than in organic solvent. An aqueous solution preparation of maleate copolymers is disclosed in Japanese Patent Application JP 60-212,410, published Oct. 24, 1985 by Fukumoto, et al. The polymerization method provides maleate copolymers with mean molecular weights of 300 to 5,000 and has a reported "polymerization rate" of, at most, 96.2%. The "polymerization rate" is the difference between the weight of monomer initially charged and the weight of copolymer recovered following polymerization (i.e., a measure of the unreacted residual monomer).

Another method for preparation of maleate copolymers in aqueous solution is disclosed in U.S. Pat. No. 4,519,920, issued May 28, 1985, to Fukumoto, et al. This process provides an initial, partial neutralization of the maleate monomer with alkali. A similar aqueous solution process for producing a polymaleate, with an option to copolymerize up to 20 mole percent of an unsaturated carboxylic acid comonomer, is disclosed in U.S. Pat. No. 4,668,735, issued May 26, 1987, to Fukumoto, et al.

U.S. Pat. No. 3,635,915, issued Jan. 18, 1972 to Gale discloses a process for preparing maleate/acrylate copolymers in aqueous solution using an inorganic peracid salt as a catalyst. The copolymers are prepared from 50 to 95 parts of acrylic acid and 5 to 50 parts of maleic acid, on a monomer weight basis (i.e., 57.5 to 96.5 mole percent acrylate and 3.5 to 42.5 mole percent maleate).

U.S. Pat. No. 4,659,793, issued Apr. 21, 1987, to Yang claims an aqueous polymerization process for manufacturing copolymer having a low residual free monomer content from carboxylic acid monomers and various comonomers. In the claimed process a metallic ion redox catalyst is used to prepare a copolymer comprising 25 to 55 weight percent (i.e., 21 to 47 mole percent) dicarboxylic acid monomer.

U.S. Pat. No. 4,314,044, issued Feb. 2, 1982 to Hughes, et al., claims an aqueous polymerization process for manufacturing copolymers of carboxylic acid monomers using a metallic ion redox catalyst system. As exemplified in the patent, the process only achieves about 95% monomer conversion. About 5 to 50 weight percent dicarboxylic acid is polymerized in the claimed process.

The processes for preparing maleate polymers and copolymers known in the art disadvantageously result in unacceptable levels of free, residual monomer, in particular, free, residual maleate monomer in the product of the polymerization. Such free, residual monomer is undesirable in many end use applications, particularly applications relating to personal care products, detergents and cleaners as well as industrial end uses involving further chemical reactions in which the residual monomer may participate as an undesirable reactant.

We have now discovered that an aqueous solution polymerization, employing a combination of at least 50 mole percent, preferably at least 70 mole percent charge preneutralization of the maleate monomer, a redox initiator catalyst using metallic ion, a slow feed addition of at least one comonomer, preferably over a period of at least three hours, to the neutralized maleate monomer and a post-feed of a polymerization initiator provides a copolymer having a weight average molecular weight of about 1,000 to 4,000, comprising at least 50 mole percent maleate, and less than 1%, on a copolymer weight basis, of residual, free monomer. This process may be carried out under ambient atmospheric conditions. An inert atmosphere, such as nitrogen, is not required for the polymerization. The resulting copolymer is useful as an antiscalant, an anti-incrustation agent, a dispersant, a detergent adjunct, a sequestrant and a water hardness salt (e.g., calcium carbonate, magnesium carbonate, magnesium sulfate, magnesium hydroxide, calcium sulfate, calcium silicate, magnesium silicate and barium sulfate) crystal modifier.

SUMMARY OF THE INVENTION

The maleate copolymers of this invention are preferably prepared by an aqueous solution polymerization process and may be used to sequester water hardness ions, modify crystal formation in water, inhibit scale formation (e.g., in circulating water systems and oil field production systems), build detergency in low- or no-phosphate detergents containing soda ash, function as an anti-redeposition agent and processing aid in detergent formulations, replace zeolite builder in detergents, especially concentrated laundry detergents, and disperse clay, salts, pigments and ores in aqueous slurries used in pulp and paper manufacturing and in drilling, mining and manufacturing operations.

The maleate copolymer comprises at least 50 mole percent maleate, 10 to 50 mole percent acrylic or methacrylic acid and 1 to 10 mole percent non-ionic monomer, e.g. acrylamide, and less than 1%, preferably less than 0.25%, by weight, free, residual monomer. The maleate copolymer has a weight average molecular weight of about 1,000 to 4,000, as determined by gel permeation chromatography methods set forth herein. In certain embodiments, the copolymer will have a Gardner color of not more than 5, preferably not more than 3.

The maleate copolymers having unique functional properties are prepared by an aqueous solution polymerization process. At least 50%, preferably at least 70%, on a mole charge basis, of the charged groups of the maleate monomer are preneutralized with alkali. An effective amount (e.g., 1–4 ppm), on a total batch weight basis, of metallic ions suitable for use as a reductant in a redox catalyst is added to the preneutralized maleate monomer. A monocarboxylic acid monomer, at least one initiator, a third nonionic comonomer, and, optionally, additional alkali, are slowly added to the neutralized maleate over at least a three hour period at 80–180° C. Following a post-addition of more initiator, preferably to provide a total of at least 4% initiator, on a total monomer mole basis, the aqueous solution of the maleate copolymer comprises less than 1%, by weight, free, residual monomer and the copolymer has a weight average molecular weight of about 1,000 to 4,000.

BRIEF DESCRIPTION OF THE DRAWINGS

The capacity of the maleate copolymers of this invention to modify water hardness salt crystal formation is illustrated in FIGS. 1–4 herein.

FIGS. 4 illustrates the crystal modification properties of a maleate terpolymer of this invention (Copolymer 1A). FIGS. 1–3 illustrate the properties of three comparative polymers. The samples and testing methods are set forth in Example 2, below.

DESCRIPTION OF THE PREFERRED EMBODIMENTS

Figure 1:
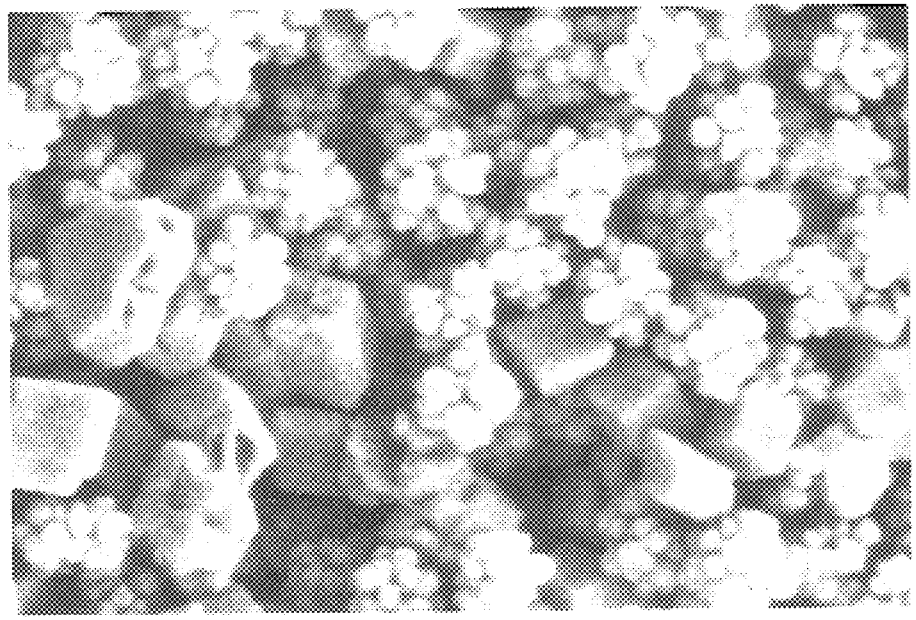
FIGS. 1–4 are photomicrographs of calcium carbonate crystals formed after treatment with the maleate copolymers and various comparative examples.

In the process for preparing the copolymers of this invention an aqueous solution, comprising 20 to 35%, preferably comprising 27 to 30%, by weight, of maleate monomer is prepared. Suitable maleate monomers include maleic acid, maleic anhydride, alkali metal maleate salts, ammonium maleate salts, and mixtures thereof.

In the initial step of the process, the aqueous maleate solution is neutralized by the addition of alkali. Each mole of maleate comprises two moles of carboxylic acid charge. Thus, two moles of alkali are required for each mole of maleate monomer to provide 100% charge neutralization of the monomer. For the purposes of this invention, at least 50% of the carboxylic acid charge on the maleate monomer is neutralized prior to polymerization. In certain preferred embodiments, at least 70% of the carboxylic acid charge, more preferably at least 80%, must be neutralized prior to polymerization. Any base may be used for this step. In a preferred embodiment, an aqueous solution of an alkali metal hydroxide, such as sodium or potassium hydroxide or an aqueous ammonium solution is added to the maleate monomer solution.

The polymerization is carried out at 80 to 180° C., preferably 90 to 100C., and most preferably, 95 to 100° C., under reflux. If the temperature is permitted to remain below 90° C., the neutralized maleate salt is likely to precipitate out of the reaction solution. If a relatively labile comonomer, such as acrylamide, is used, then monomer will be lost at temperatures exceeding 100° C. and it is preferred to maintain the temperature below 100° C. The reflux may be carried out under ambient atmosphere or under inert atmosphere, such as nitrogen. Likewise, the reaction may be carried out under greater than atmospheric pressure (e.g., ½ to 1½ atmospheres), although ordinary atmospheric conditions are suitable and are preferred.

The process employs as a polymerization initiator at least one redox catalyst, comprising at least one initiator and at least one metallic ion suitable for use as a reductant in a redox catalyst system. Such reducing cations include the metallic ions obtained from iron, zinc, cobalt, molybdenum, chromium, nickel, vanadium and cerium, and combinations thereof. Preferred metallic ions are obtained from ferrous ammonium sulfate, ferrous sulfate, ferrous chloride, cobalt salts (e.g., cobalt sulfate hexahydrate), vanadium salts, and combinations thereof, and other water soluble salts producing metallic ions that are susceptible to oxidation by oxidants typically used in redox catalysts as polymerization initiators. Such initiators include hydrogen peroxide, benzoyl peroxide, sodium persulfate and sodium persulfate bisulfite, t-butyl hydroperoxide, cumene hydroperoxide, dialkyl peroxide, ammonium persulfate and ammonium persulfate/bisulfite, and combinations thereof. A mixture of initiators is preferred. The initiator is preferably utilized at about 4 to 15%, on a total monomer mole basis, together with an effective amount of metallic ion, preferably at least 1 ppm, most preferably at least 4 ppm metallic ion, on a total batch weight basis. The initiator and metallic ion may be added to the initial maleate charge, or added with the feed of the comonomer(s), or both. A reductant, such as erythorbic acid or ascorbic acid is preferably added after polymerization. A post-polymerization addition of initiator is an essential aspect of this invention.

In a preferred embodiment an initiator comprising, on a total monomer weight basis, 8 to 12% hydrogen peroxide and 3 to 5% sodium persulfate is added along with the comonomer(s) feed. A total of 3 to 18 ppm ferrous ammonium sulfate hexahydrate is added to the initial maleate charge. A total of 1 to 2% hydrogen peroxide and 0.25 to 0.35% sodium persulfate is added during the post-polymerization period.

The comonomer(s), either in aqueous solution or neat, are added slowly during polymerization over a period from about 3 to 10 hours. In a preferred embodiment, the comonomer(s) are added, without prior neutralization, to the polymerization flask over the 3 to 10 hour period.

Suitable comonomers include ethylenically unsaturated monocarboxylic acids, preferably acrylic acid, and, optionally, other copolymerizable comonomers. Preferred monocarboxylic acid monomers include acrylic acid, methacrylic acid and ethacrylic acid, and combinations thereof (the "acrylate" monomer). The acrylate monomers useful in the production of the polymers of this invention are the olefinically unsaturated carboxylic acids containing at least one activated carbon-to-carbon olefinic double bond, and at least one carboxyl group, that is, an acid containing an olefinic double bond which readily functions in polymerization because of its presence in the monomer molecule either in the alpha-beta position with respect to a carboxyl group, or as a part of a terminal methylene grouping.

Useful olefinically-unsaturated acids of this class include such widely divergent materials as the acrylic acid comonomers typified by acrylic acid itself, methacrylic acid, ethacrylic acid, alpha-chloro-acrylic acid, alpha-cyano acrylic acid, beta methyl-acrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, citraconic acid, mesaconic acid, glutaconic acid, aconitic acid, fumaric acid, and tricarboxy ethylene. For the polycarboxylic acid monomers, an anhydride group is formed by the elimination of one molecule of water from two carboxyl groups located on the same polycarboxylic acid molecule. The preferred carboxylic monomers for use in this invention are the monoolefinic acrylic acids having a substituent selected from the class consisting of hydrogen, halogen and hydroxyl groups, monovalent alkyl radicals, monovalent aryl radicals, monovalent aralkyl radicals, monovalent alkaryl radicals and monovalent cycloaliphatic radicals.

Other suitable optional comonomers for preparing the copolymers herein include any water-soluble, unsaturated compounds that are capable of free radical polymerization utilizing a redox catalyst.

Water soluble is defined herein to mean comonomers which have a minimum solubility of 5% by weight in water at 25° C. Such comonomers include acrylic and methacrylic acid (the "acrylate" monomer group); acrylamide, methacrylamide, acrylonitrile; N,N-dialkylaminoalkyl acrylates and methacrylates (wherein the alkyl group contains 1 to 4 carbon atoms); ethylenically unsaturated quaternary ammonium salts such as N,N,N-trimethylaminoethyl methacrylate methylsulfate or halide, 2-hydroxy-3-methacryloxypropyltrimethyl-ammonium methyl sulfate or halide, vinylbenzyltrialkylammonium methylsulfate or halide; sodium or ammonium styrenesulfonate; vinyl pyrrolidinone; hydroxyl alkyl acrylates and methacrylates; sodium 2-acrylamido-2-methylpropane sulfonate, etc. Various other water-soluble comonomers suitable for polymerization with maleate and acrylate monomers are known to those skilled in the art.

The maleate monomer is present in the copolymers of this invention at a mole ratio of at least 50%. The second carboxylic acid monomer, preferably acrylic acid monomer, is present in the copolymer of this invention at a mole ratio of 10 to 50%. The copolymer further comprise at least one additional comonomer, preferably non-ionic, exemplified by acrylamide, methacrylamide, ethylacrylamide, propylacrylamide, isopropylacrylamide, N,N-dimethylacrylamide, N,N-diethylacrylamide, N,N-dipropylacrylamide, N-methylolacrylamide, t-butylacrylamide, N-vinyl-2-pyrrolidinone, diallylamine, hydroxypropylacrylate, hydroxyethylacrylate and vinyl acetate. In a preferred embodiment, the copolymer comprises at least 50 mole percent maleate, 10 to 50 mole percent acrylate and 1 to 10 mole percent non-ionic comonomer.

The copolymers prepared by the process of this invention preferably have a weight average molecular weight of about 1,000 to 4,000. At these molecular weights, the copolymers of this invention exhibit improved performance in controlling water hardness, compared to higher molecular weight (e.g., 5,000–30,000) copolymers comprising maleate/acrylate monomers. The method for determining the weight average molecular weight ($M_w$) of the copolymers is set forth herein below.

The copolymers of this invention are characterized by an extremely low residual monomer content of less than about 1%, on a dry copolymer weight basis. In a preferred embodiment, the copolymers of this invention comprise no more than 0.25% residual monomer, on a copolymer dry weight basis. The percent residual monomer calculations are based on maleate monomer.

The copolymers of maleate/acrylate/comonomer comprising at least 50 mole percent maleate and having a weight average molecular weight of 1,000 to 4,000 and less than 1%, on a copolymer weight basis, residual monomer, exhibit unique functional characteristics in various end use applications. The copolymers of this invention are useful in quantities greater than 0.5 ppm, preferably at 1 to 100 ppm, most preferably 5 to 30 ppm, on a water weight basis, to control scale formation and sequester water hardness ions in water treatment applications. When the maleate copolymers were evaluated for modification of water hardness salts, copolymers comprising a third comonomer provided superior modification of salt crystal formation and much greater efficacy in controlling water hardness relative to commercially used polymers. The maleate copolymer is useful as a water treatment agent in boiler feed water, cooling water, air conditioning water, circulating water (for heating, cooling or maintaining temperature or for insulation), commercial water systems containing water hardness ions, manufacturing operations, and waste water treatment operations. Effective usage levels will depend upon the particular water system to be treated, salt concentration and other variables. The maleate copolymers may be used to treat water used in paper manufacturing, sugar manufacturing, oil field production (e.g., at 100 ppm to 0.5% of the water system) and other industrial applications requiring salt crystal modifications in aqueous solutions, slurries and dispersions.

The maleate copolymers also may be used as dispersants in industrial applications to provide stable aqueous dispersions or slurries of pigments, clays, salts, metallic ores and oxides, and the like, in a variety of manufacturing operations. As a dispersant, the maleate copolymer is typically effective at a usage level of 0.05 to 2.0%, preferably 0.05 to 0.5%, on a solids weight basis.

In particular, the maleate copolymers may be used to inhibit salt byproduct crystal formation and deposition and to disperse solids (e.g., clay, pigments) in wood pulp aqueous slurries and in other aqueous systems used in the manufacture of paper.

It is believed that the unique ability of the maleate copolymers herein to modify crystals formed from calcium salt (and other water hardness salts) contributes to their efficacy in detergent formulations. When used in detergent compositions, the maleate copolymer comprises at least 50 mole percent maleate monomer, 10 to 50 mole percent acrylic monomer and 1 to 10 mole percent of, nitrogen-containing, nonionic monomer selected from the group consisting of acrylamide, methacrylamide, ethylacrylamide, propylacrylamide, isopropylacrylamide, N,N-dimethylacrylamide, N,N-diethylacrylamide, N,N-dipropylacrylamide, N-methylolacrylamide and t-butylacrylamide. It is critical in the detergent applcations that the copolymers of the invention have sufficient color characteristics such that they are effective for use in detergent compositions. However, excessive use of the nitrogen-containing, nonionic comonomer typically results in increased color, which is undesirable. It is preferred that the maleate copolymers utilized in detergent compositions have a Gardner color of not more than 5, preferably not more than 3, as determined utilizing a Gardner Laboratories Standard Color Comparison Scale. To achieve the required color, the level of the nitrogen-containing, nonionic monomer, e.g., acrylamide, should not exceed about 10 mole percent, as levels much above 10 mole percent produce copolymers of insufficient color. For instance, maleate polymers comprising 10 mole percent of acrylamide were found to have Gardner color of 4, while maleate monomers comprising 15 mole percent of acrylamide were found to have Gardner color of 6. Additionally, preneutralization of at least 70 mole percent of the carboxylic acid charge on the maleate monomer generally is required to achieve acceptable color for use in detergent compositions. Preneutralization of at least 80 percent of the carboxylic acid charge on the maleate monomer is more preferred.

In addition to contributing to color problems, levels of the nitrogen-containing, nonionic monomer in excess of about 10 mole percent also contribute to odor problems in certain detergent applications. When the maleate copolymers of the present invention contain nitrogen-containing, nonionic comonomers and are incorporated into detergent compositions which contain soda ash, the nitrogen is hydrolyzed to ammonia or amine. For this reason, levels of use should not exceed about 10 mole percent and preferably should not exceed about 5 mole percent, i.e., 1 to 5 mole percent nitrogen-containing, nonionic monomer is particularly preferred where odor is of concern.

The efficacy of the copolymers is most noticeable in sodium carbonate (soda ash) based powdered detergents and in detergents wherein up to 100% of a zeolite builder system is replaced with a combination of soda ash and copolymer (typically in a ratio of about 160:1 to 8:1 soda ash:copolymer). The maleate copolymer is believed to improve detergency as a co-builder and to inhibit soil redeposition and water hardness salt deposition. The maleate copolymer may be used as a processing aid during blending, drying and agglomerating operations to provide uniform distribution of the components of detergent compositions, to provide desired particle size and density, and to provide other desirable attributes during manufacture and storage of detergents, especially powdered detergents.

Typical detergent formulations which may be improved by the addition of the maleate copolymer of this invention are disclosed in U.S. Pat. Nos. 4,663,071, issued May 5, 1987 to Bush, et al., 4,906,397, issued Mar. 6, 1990 to Leighton, et al., 5,149,455, issued Sep. 22, 1992 to Jacobs, et al., 5,160,657 issued Nov. 3, 1992 to Bortolotti, et al., and 5,164,108, issued Nov. 17, 1992 to Appel, et al., which are hereby incorporated by reference.

Detergent compositions which may be improved by the addition of the maleate copolymers of this invention include detergent compositions comprising 5 to 80% soda ash, 5 to 24% surfactant and 0.5 to 25% of the maleate copolymer. In the alternative, in a detergent composition comprising 5 to 80% soda ash, 5 to 24% surfactant and 0.5 to 25% zeolite builder, on a detergent composition dry weight basis, up to 100% of the zeolite builder may be replaced with an equivalent amount of the maleate copolymers of this invention.

In a preferred embodiment, the copolymer is incorporated into a powdered household laundry detergent formulation, comprising 10 to 25% surfactant(s), 2 to 63% builder(s), and 12 to 88% optional components, such as buffers, enzymes, softeners, antistatic agents, bleaches, optical brightners, perfumes and fillers. The maleate copolymer is also useful in concentrated powdered detergents comprising at least 20%, by weight, surfactant.

In a second preferred embodiment, the copolymer is incorporated into a liquid household laundry detergent formulation, comprising 5 to 50% surfactant(s), 2 to 55% builder(s), and 15 to 95% of a combination of optional ingredients, such as buffers, enzymes, softeners, antistatic agents, fluorescers, perfumes, water and fillers. Also included herein are any detergent formulations, used commercially or experimentally, which employ a phosphate co-builder or phosphate-replacer builder or co-builder or any builder which functions chiefly to sequester calcium, magnesium, barium and other polyvalent cations present in hard water. Formulations employing mixtures of builders, including phosphate-containing mixtures, are also useful. The copolymer may be used as a co-builder, a builder, an anti-redeposition agent, an anti-encrustation agent, and as a processing aid in these detergents.

Optional components of the detergent formulations include, but are not limited to, ion exchangers, alkalies, anticorrosion materials, anti-redeposition materials, optical brighteners, fragrances, dyes, fillers, chelating agents, enzymes, fabric whiteners and brighteners, sudsing control agents, solvents, hydrotropes, bleaching agents, bleach precursors, buffering agents, soil removal agents, soil release agents, fabric softening agent and opacifiers. These optional components may comprise up to about 90% of the detergent formulation.

The detergent compositions of this invention may take any of the physical forms associated with detergent compositions, such as powders, granules, cakes and liquids. They may also be produced by any of the techniques commonly employed in the manufacture of detergent compositions, including slurry-making and spray-drying processes for the manufacture of detergent powders. The builder may be incorporated in the slurry or blended with spray-dried base powder. The practitioner will recognize which formulations are best suited to the physical form selected for a particular detergent composition and adjust the formulation accordingly.

For example, in concentrated detergent powders (e.g., more than 20% surfactant or a bulk density of about 550 to 750 g/l) the copolymer of this invention are preferably employed as a processing aid during blending and drying operations to prevent non-uniform product and prevent loss of active components.

MOLECULAR WEIGHT ANALYSIS

The polymers were analyzed using aqueous gel permeation chromatography designed for water soluble linear polymers of acrylic acid. A ToyoSoda PWXL column bank, a differential refractometry detector and a 0.05M $NaH_2PO_4$ $H_2O+0.05M$ $Na_2HPO_4$ mobile phase are utilized a pressure of about 1,000 psi, a flow rate of 1.0 mL/min and a column temperature of 35° C. The calibration was performed with polyacrylic acid standards of known weight-average and number-average molecular weights. Unknown polymers were diluted to a concentration equivalent to that of the standards and subsequently analyzed under the conditions described above.

EXAMPLE 1

This example illustrates the process for preparing the copolymers of this invention. Synthesis of the copolymers is described in Parts A–E, below. Copolymer characteristics are described in Table I, below.

TABLE I

Copolymer Synthesis

| Copolymer Sample | Monomer[a] Molar Ratio | Degree of Pre-Neutralization of Maleate (mole %) | Final pH | Mw | Mn | Percent Residual Monomer[b] |
|---|---|---|---|---|---|---|
| Part A | | | | | | |
| 1 | MA/AA/AM 50/45/5 | 70 | 5.2 | 2522 | 1805 | <0.01 |
| 2 | MA/AA 60/40 | 80 | 5.7 | 2297 | 1555 | 0.1 |
| 3 | MA/AA 50/50 | 50 | 6.3 | 2672 | 1254 | <0.01 |

TABLE I-continued

Copolymer Synthesis

| Copolymer Sample | Monomer[a] Molar Ratio | Degree of Pre-Neutralization of Maleate (mole %) | Final pH | Mw | Mn | Percent Residual Monomer[b] |
|---|---|---|---|---|---|---|
| Part B | | | | | | |
| 4 | MA/AM/AM 50/40/10 | 75 | 5.2 | 2367 | 1755 | 0.03 |
| 5 | MA/AA/AM 50/42/8 | 85 | 5.7 | 2203 | 1653 | <0.1 |
| 6 | MA/AA/AM 60/35/5 | 85 | 5.8 | 1786 | 1113 | 0.18 |
| 7 | MA/AA/AM 50/49/1 | 80 | 4.9 | 2700 | 1906 | <0.01 |
| 8 | MA/AA/AM 50/35/15 | 80 | 5.6 | 2830 | 1909 | 0.07 |
| Part C | | | | | | |
| 9 | MA/AA/VP 50/45/5 | 80 | 5.0 | 2639 | 1873 | <0.1 |
| 10 | MA/AA/DA 50/45/5 | 80 | 5.2 | 2990 | 1876 | <0.1 |
| 11 | MA/AA/HPA 50/45/5 | 80 | 5.1 | 2698 | 1727 | <0.1 |
| 12 | MA/AA/HEA 50/45/5 | 80 | 5.1 | 2652 | 1851 | <0.1 |
| 13 | MA/AA/AM 50/45/5 | 80 | 5.4 | 3063 | 2028 | <0.1 |
| Part D | | | | | | |
| 14 | MA/AA/VA 50/45/5 | 80 | 4.8 | 3246 | 2092 | <0.01 |
| 15 | MA/AM 70/30 | 50 | 5.8 | 2698 | 1643 | <0.01 |
| Part E | | | | | | |
| 16 | MA/AA 67/33 | 52.5 | — | 3600 | — (precipitated)[c] | 2.1 |
| Part F | | | | | | |
| 17 | MA/AA 67/33 | 52.5 | 5.2 | 3094 | 1938 | 0.40 |

[a]MA is maleic acid or anhydride; AA is acrylic acid; AM is acrylamide; VP is N-vinyl-2-pyrrolidinone; DA is diallylamine; HPA is hydroxypropylacrylate; HEA is hydroxyethylacrylate; and VA is vinyl acetate.
[b]For samples 9–13, monomer content was measured by gel permeation chromatography following polymerization. All other samples were measured using a liquid chromatograph.
[c]The residual monomer was present in sufficient quantity to precipitate from the polymerization solution. The precipitate was redissolved and analyzed by liquid chromatography. No final pH nor $M_n$ measurements were made.

Part A

Copolymer 1 (50/45/5 maleic/acrylic/acrylamide): A charge of 2.47 moles (242.0 grams) maleic an hydride in 350 grams of deionized water was placed into a flask equipped with two dropping funnels, a reflux condenser, a nitrogen inlet and a stirrer. The maleic anhydride was 70% neutralized by the addition of 276.6 grams of 50% sodium hydroxide solution (0.7 mole of base/mole of carboxylic acid charge of the maleate monomer, or 1.4 moles base/mole of maleate monomer). Based on monomer weight, 10.6 ppm ferrous ions (0.03 grams of ferrous ammonium sulfate hexahydrate), and 1.0 g isoascorbic acid were added to the flask.

At a reflux temperature of 98–100° C., a feed containing 2.23 moles (160.6 grams) of acrylic acid and 0.25 moles acrylamide (34.0 g of a 52% aqueous solution) and 30.0 g of a 50% solution of sodium hydroxide in 130.0 grams of deionized water, and a second feed containing 11.8% (142 g) of hydrogen peroxide and 4.3% sodium persulfate (18 g in 104.5 water), on a total monomer weight basis, were added drop wise, with stirring, to the flask over a 5 hour, 15 minute period followed by a two hour cook.

Total solids, pH and intrinsic viscosity in 1N NaCl were recorded. The molecular weight was measured by gel permeation chromatography using polyacrylate standards. The residual monomer (a total of maleic acid, acrylic acid and fumaric acid) was measured by liquid chromatography using a Waters Liquid Chromatograph apparatus.

Copolymer 2 (67/33 maleic/acrylic): A copolymer was synthesized as described above except: (1) 1.32 moles of maleic anhydride (129.4 grams) and 0.66 moles of acrylic acid (47.5 grams) were used, (2) the initiator charge comprised 10.8% hydrogen peroxide and 4.5% sodium persulfate, on a total monomer mole basis, (3) 5 ppm (on a total batch weight basis) ferrous ammonium sulfate hexahydrate, was added to the maleate monomer, (4) the feed time was 5 hours followed by a 20 minute initiator post feed and (5) a post treatment of 0.17%, on a monomer weight basis, of isoascorbic acid was added to the aqueous copolymer.

Copolymer 3 (50/50 maleic/acrylic): A copolymer was synthesized as described above, except: (1) a charge of 2.57 moles of maleic anhydride (251.5 g) in 400 g of deionized water 0.118 g ferrous ammonium sulfate hexahydrate, 150 g isopropanol, and 209.5 g of a 50% solution of sodium hydroxide, and a feed of 2.57 moles acrylic acid (184.8 g) and 104.4 g of a 50% solution of sodium hydroxide in 140.1 g of deionized water were used, (2), the maleate was 50% neutralized with base prior to polymerization, (3) comonomer feed was added over a 5 hour period, and an additional initiator (168.5 g of a 35% solution of hydrogen peroxide) feed was added simultaneously over a 6 hour period. Following the synthesis, 85 g of a 50% sodium hydroxide solution, was added to the flask and the copolymer was recovered in aqueous solution following distillation to remove isopropanol.

Part B

Copolymers 4–8 (maleic/acrylic/acryl-amide): Copolymers were synthesized as described above except that the molar ratio of the monomers was varied.

Copolymer 4 was prepared from a molar ratio of 50/40/10 maleic/acrylic/acrylamide, using 2.57 moles maleic anhydride (251.9 g), 2.06 moles acrylic acid (148.3 g) and 0.51 moles acrylamide (69.6 g of a 52% solution). The initial charge included the maleate, 400.0 g of deionized water, 308.4 g of a 50% sodium hydroxide solution, 150.0 g isopropanol, 0.118 g of ferrous ammonium sulfate hexahydrate and 2.5 g of a 35% solution of hydrogen peroxide. The monomer feed contained 150.0 g of deionized water in addition to the acrylic acid and acrylamide. The initiator feed contained 183.0 g of hydrogen peroxide in 100.0 g of deionized water. Following synthesis, 250.0 g of 50% sodium hydroxide was added.

Copolymer 5 was prepared from a molar ratio of 50/42/8 maleic/acrylic/acrylamide, using 2.57 moles maleic anhydride (251.9 g), 2.14 moles acrylic acid (154.0 g, glacial) and 0.43 moles acrylamide (58.7 g, 52% solution). The initial charge contained the maleic anhydride, 362 g deionized water 349.5 g of 50% sodium hydroxide, and an initiator mixture of 0.03 g ferrous ammonium sulfate hexahydrate and 3.0 g of ethythorbic acid. The monomer feed contained the acrylic acid, acrylamide, 20.0 g of 50% sodium hydroxide and 175.0 g of deionized water. The initiator feed contained 1.42 moles of hydrogen peroxide (138.0 g of a 35% solution) and 0.122 moles of sodium persulfate (29 g in 116.5 g of deionized water). The monomer was added over 5 hours, the initiator over 5 hours and 15 minutes and synthesis was followed by a 2 hour cook.

Copolymer 6 was prepared from a molar ratio of 60/35/5 maleic/acrylic/acrylamide, using 3.08 moles maleic anhydride (301.8 g), 1.80 moles acrylic acid (129.6 g, glacial) and 0.25 moles acrylamide (34.2 g, 52% solution). The initial charge contained the same components as in copolymer 5 except sodium hydroxide was increased to 418.8 g and the water to 385.0 g. The monomer feed contained the monomers in 15.0 g of 50% sodium hydroxide and 120.0 g of water. The initiator feed contained 150.0 g of 35% hydrogen peroxide, and 35.0 g of sodium persulfate in 120.0 g of water.

Copolymer 7 was prepared from a molar ratio of 50/49/1 maleic/acrylic/acrylamide, using 1.23 moles maleic anhydride (121 g), 1.21 moles acrylic acid (87.1 g, glacial) and 0.025 moles acrylamide (3.5 g, 50% solution). The initial charge contained maleic anhydride, 175 g deionized water 158 g 50% sodium hydroxide, and 0.02 g of ferrous ammonium sulfate hexahydrate. The monomer feed contained 64.5 g of 35% hydrogen peroxide, and 9.5 g of sodium persulfate in 10 g deionized water.

Copolymer 8 was prepared from a molar ratio of 50/35/15 maleic/acrylic/acrylamide, using 1.23 moles maleic anhydride, (121 g), 0.863 moles acrylic acid (62.1 g, glacial) and 0.37 moles acrylamide (52.5 g of 50% solution). The initial charge contained the same components as Copolymer 7. The monomer feed contained the monomers in 45.0 g of deionized water. The initiator feed was the same as Copolymer 7.

Part C

Copolymers 9–14 (maleic/acrylic 50/45 and 5% third monomer): Copolymers 9–14 were synthesized as described above for copolymer 1, except that various non-ionic monomers were substituted for acrylamide at 5 mole percent. The third monomers tested included, N-vinylpyrrolidone, diallylamine, hydroxypropyl acrylate, hydroxyethyl acrylate, vinyl acetate and acrylamide (control).

Part D

For comparative purposes, copolymer 15, a copolymer of maleic acid and acrylamide in a molar ratio of 70/30 was synthesized as described for copolymer 3, above, except no acrylic acid was used.

Part E

For comparative purposes, copolymer 16, a copolymer of maleic and acrylic acids in 67/33 molar ratio, was synthesized as described in Example 1 of U.S. Pat. No. 4,519,920 (the "Kao '920 patent"). In the Kao '920 synthesis, the initial maleate charge was only 52.5% neutralized with sodium hydroxide (a molar ratio of maleic anhydride/sodium hydroxide of 1.00/1.05). The Kao '920 synthesis also differed from the synthesis of copolymer 2 of this invention in that an additional 5.0% sodium hydroxide was added with the acrylic acid, only 9.55%, on a total monomer molar basis, of a single initiator (hydrogen peroxide) was used, and there was no initiator post-feed.

Part F

Copolymer 17, a copolymer of maleic and acrylic acids in 67/33 molar ratio, was synthesized as described for copolymer 2, above, except the maleic anhydride was 52.5% pre-neutralized and the initiator charge was increased to 15.5%, on a total monomer weight basis.

EXAMPLE 2

This example illustrates the efficacy of the copolymers of this invention in altering calcium crystal formation and inhibiting scale formation in water treatment systems.

Calcium carbonate crystal formation was tested by treating aqueous solutions of calcium carbonate (160 ppm Ca ++) with a second batch of copolymer 1 of Table I ("copolymer 1A", Table II, was made using, as the initiator, 10.8% hydrogen peroxide, 4.5% sodium persulfate and 5.6% ferrous ion) and control polymers selected from commercial polyacrylate (molecular weight 2,600–3,000), acrylic acid/maleic acid 70/30 copolymer (molecular weight about 4,500), a 50/50 maleic/acrylic acid copolymer (Copolymer 3, Table I), a sulfonate styrene/maleic acid 3/1 molar ratio copolymer and a sulfonate styrene/maleic acid 1/1 mole ratio copolymer. For each polymer sample, 0.1% active polymer solution (3 mls; 30 ppm polymer) was added to a bottle containing 20 mls of 0.1M $Na_2CO_3$ and 30 mls of 0.1M $NaHCO_3$. Control blank samples were also prepared. One set of samples was equilibrated to 50° C. in a water batch and a matching set of samples was equilibrated to 70° C. Solutions of $CaCl_2$ were equilibrated to either 50 or 70° C. and a 50 ml aliquot (160 pp Ca++) of $CaCl_2$ was added to each test bottle and the control bottle at the corresponding temperature. The bottles were inverted three times and left in the 50 and 70° C. water baths overnight. The calcium carbonate crystals that precipitated from these samples were examined by scanning electron microscopy.

A scanning electron microscope (J.E.O.L. Model JXA-6400, obtained from Japanese Electron Optical Ltd., Japan) set at 15 KV, with 2,000X magnification, was used to examine calcium carbonate crystals formed after treatment of calcium carbonate solutions with experimental and control polymer. Photomicrographs of various crystal formations were prepared.

Photomicrographs of crystals treated with the Copolymer 1A, the polyacrylate, the 70/30 acrylate/maleate co-polymer, and the 50/50 maleic/acrylic copolymer (copolymer 3, Table I) are shown in FIGS. 1–4.

Figure 2:
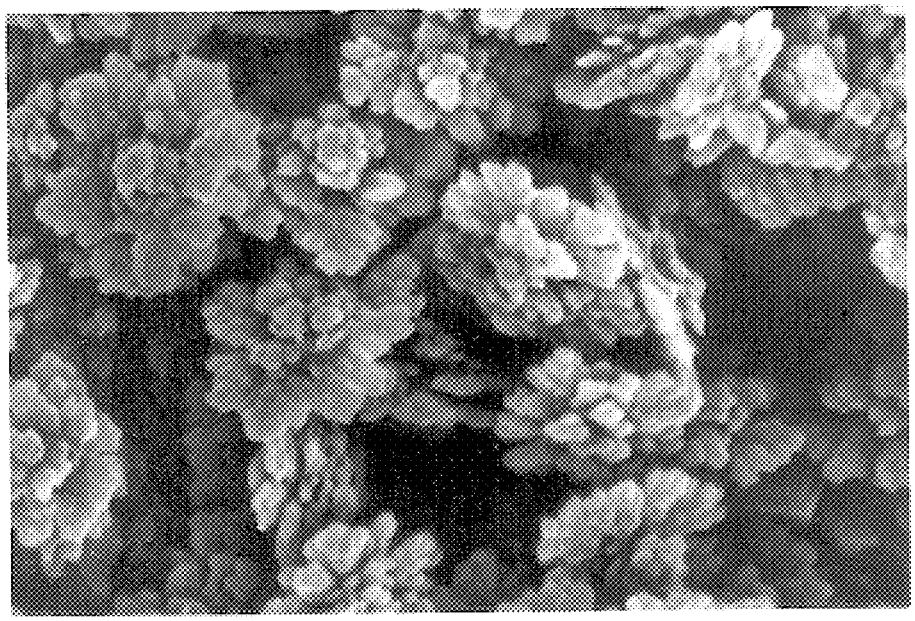
Figure 3:
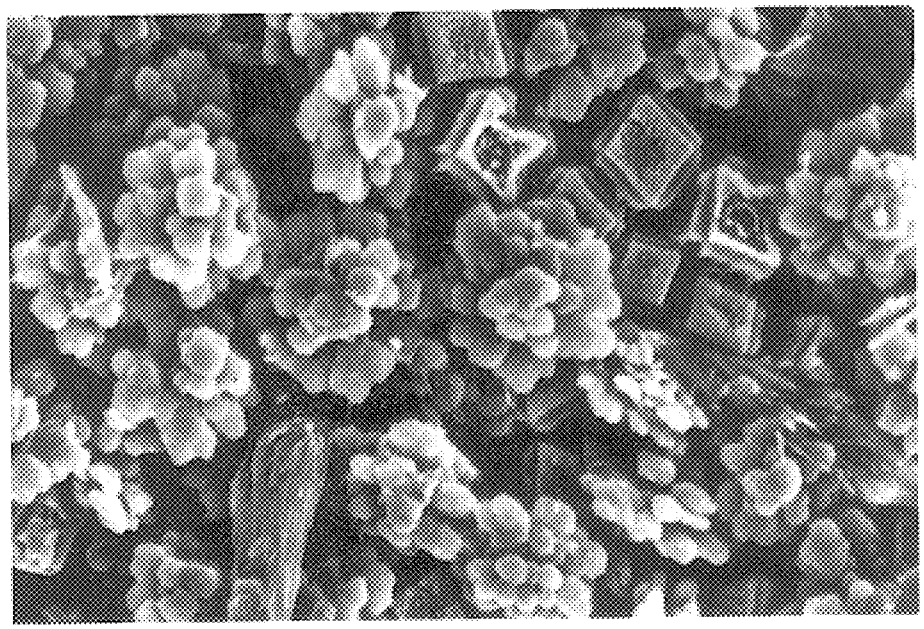
Figure 4:
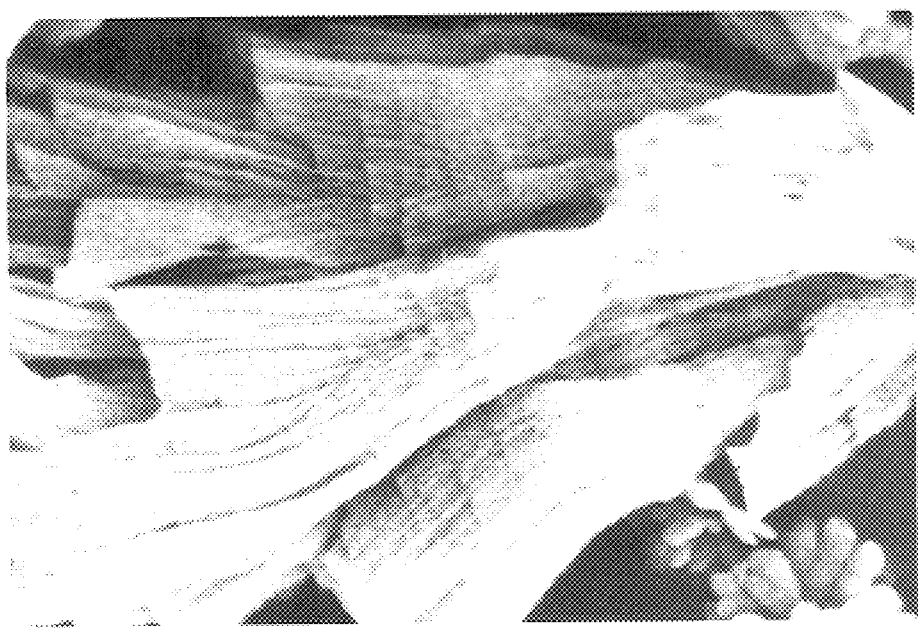

As can be seen by comparing FIG. 4 (copolymer 1A of this invention) with FIGS. 1 and 2, treatment of hard water with the copolymers of this invention significantly distorted crystal morphology, creating crystals having narrow points of attachment to nucleation sites. The small attachment site of these crystals is believed to create mechanical instability and, thereby, inhibit scale deposition. The control polymers did not modify crystal structure in this manner. The control crystals shown in FIGS. 1 and 2 exhibit traditional calcite and aragonite morphology with some distorted calcite and deformed aragonite morphology observed.

STRESSED CALCIUM CARBONATE TEST

High electrolyte and high pH conditions were used to quantitatively test the copolymers of this invention for copolymer effects on calcium carbonate threshold inhibition, dispersancy and surface adhesion.

A series of samples containing 160 ppm Ca++ ions were prepared at each of three pH levels (9.2, 10.7 and 12.3), blanks were prepared without added polymer and test samples were treated with 0.2% solutions of active, experimental and control polymers (1 ml of solution=10 ppm polymer in sample).

To prepare the samples at pH 9.2, 20 mls of 0.2M $Na_2CO_3$ solution, 30 mls of a 0.2M $NaHCO_3$ solution and 50 mls of a 4.0M NaCl solution were added to a 250 ml erlenmeyer flask and, where indicated, polymer samples were added to the flasks. For pH 10.7 samples, 45 mls of 0.2M $NaCO_3$ solution and 5 mls of 0.2M $NaHCO_3$ solution were used. A 100 ml aliquot of a $CaCl_2$ 2 $H_2O$ aqueous solution (0.588 g/L) containing 160 ppm Ca++ ions was added to each flask. Flasks were stoppered and placed into a 50° C. water bath for 48 hours.

For the 12.3 pH samples, 50 mls of the 0.2M $NaCO_3$ solution was added to the flasks, polymer solutions were added and then 50 ml of a 4.0M NaCl solution containing 0.5M NaOH was added simultaneously with 100 ml of the $CaCl_2$ solution. Sample preparation was otherwise identical to that of the pH 9.2 and 10.7 samples.

Samples were divided into three parts to measure effects of polymer treatment on calcium carbonate solution properties: (1) filtrate aliquot, (2) membrane aliquot and (3) adherent aliquot. "Filtrate" aliquots contained calcium stabilized (inhibited) by the polymers. This is representative of the "threshold effect" of the polymer. "Membrane" aliquots contained solid material collected on a filter membrane. This is representative of "dispersing effect" of the polymers. "Adherent" aliquots contained material which had been attached to the surface of the sample flasks. This is representative of the effect of the polymer on the "adhesive" properties of formed crystals.

To separate samples into these aliquots, the samples were removed from the water bath and allowed to equilibrate to room temperature. Holding the stopper securely, the sample flask was gently inverted three times and immediately filtered through 0.45 μm membrane filters to prepare the "filtrate" aliquot. A total of 1 ml of 12% KCl and 5 mls from the side arm flask were pipetted into a 100 ml volumetric flask. An aliquot of 50 mls of 14% nitric acid was added and the flask was filled to volume with deionized water. (5 mls of the filtrate is equal to 1:20 dilution).

To prepare the "adherent" aliquot, 50 mls of 14% nitric acid was poured into the sample flask and swirled to dissolve crystals. The contents of the sample flask were transferred into a 100 ml volumetric flask and the sample flask was rinsed with 30 mls of deionized water while transferring into the volumetric flask. A total of 1 ml of 12% KCl was added to the volumetric and it was filled to the mark with deionized water.

To prepare the "membrane" aliquot, the filtration apparatus was transferred to another sidearm flask and 50 mls of 14% nitric acid was slowly poured through the filter membrane, and the membrane was rinsed with 20 mls of deionized water. The contents of the filtration flask containing the "membrane" aliquot were transferred into a 100 ml volumetric flask. The flask was rinsed with about 20 mls of deionized water while transferring into the volumetric flask, 1 ml of 12% KCl was added to the volumetric and it was filled to volume with deionized water. Samples were analyzed by flame atomic absorption spectrophotometry on a Perkin Elmer Model 5100 Atomic Absorption Spectrophotometer. Results reported in Table II are calculated as the percent of calcium in the sample aliquots.

TABLE II

Polymer Inhibition of Calcium Carbonate at High ph and High Electrolyte
Percent Calcium

| Polymer[a] (Mw) | Polymer Treatment Level mg/l | Adherent % | Membrane % | Filtrate % |
|---|---|---|---|---|
| Polyacrylate[c] | 12 | 11.3 | 87.3 | 1.1 |
| (2,500) | 18 | 6.9 | 92.6 | 0.2 |
|  | 24 | 6.9 | 92.2 | 0.6 |
|  | 30 | 7.3 | 91.9 | 0.5 |
| Acrylate/maleate[c] | 12 | 21.7 | 18.4 | 59.5 |
| 70/30 | 18 | 24.0 | 10.7 | 65.0 |
| (4,500) | 24 | 5.9 | 9.5 | 84.3 |
|  | 30 | 6.6 | 7.1 | 86.0 |
| Sokalan ® CP-5[b] | 12 | 34.6 | 29.1 | 36.2 |
| (18,599) | 18 | 34.7 | 9.1 | 56.1 |
|  | 24 | 20.0 | 17.7 | 62.2 |
|  | 30 | 14.1 | 17.8 | 68.0 |
| Solalan ® CP-7[b] | 12 | 40.7 | 6.2 | 53.0 |
| (13,966) | 18 | 26.8 | 8.7 | 64.4 |
|  | 24 | 17.4 | 7.2 | 75.3 |
|  | 30 | 9.7 | 6.9 | 83.3 |
| Sokalan ® CP-45[b] | 12 | 41.6 | 13.9 | 44.4 |
| (22,850) | 18 | 32.8 | 16.7 | 50.4 |
|  | 24 | 37.1 | 8.8 | 54.1 |
|  | 30 | 22.9 | 8.8 | 68.2 |
| Copolymer 1A[d] | 12 | 20.9 | 4.6 | 74.3 |

TABLE II-continued

Polymer Inhibition of Calcium Carbonate at High ph and High Electrolyte
Percent Calcium

| Polymer[a] (Mw) | Polymer Treatment Level mg/1 | Adherent % | Membrane % | Filtrate % |
|---|---|---|---|---|
| (2,600) | 18 | 10.6 | 3.4 | 85.7 |
| MA/AA/AM | 24 | 1.2 | 4.2 | 94.4 |
| 50/45/5 | 30 | 1.3 | 4.8 | 93.8 |
| Copolymer 3 | 12 | 19.2 | 11.4 | 69.2 |
| (2,672) | 18 | 12.1 | 6.4 | 81.3 |
| MA/AA | 24 | 8.5 | 6.9 | 84.4 |
| 50/50 | 30 | 3.5 | 12.2 | 84.1 |
| Copolymer 9 | 12 | 29.3 | 5.0 | 65.5 |
| (2,639) | 18 | 16.5 | 5.4 | 77.9 |
| MA/AA/VP | 24 | 7.2 | 6.0 | 86.6 |
| 50/45/5 | 30 | 1.0 | 7.9 | 91.0 |
| Copolymer 10 | 12 | 25.3 | 6.6 | 68.0 |
| (2,990) | 18 | 14.6 | 4.3 | 81.0 |
| MA/AA/DA | 24 | 9.3 | 5.0 | 85.5 |
| 50/45/5 | 30 | 1.7 | 3.5 | 94.7 |
| Copolymer 11 | 12 | 19.9 | 4.8 | 75.2 |
| (2,698) | 18 | 10.0 | 3.0 | 86.8 |
| MA/AA/HPA | 24 | 1.2 | 3.6 | 95.0 |
| 50/45/5 | 30 | 0.9 | 4.5 | 94.3 |

[a]Experimental polymers are described in Table I and Example 1, above.
[b]Commercial acrylate polymers from BASF Corporation, Parsippany, New Jersey.
[c]Commercial polymers obtained from Alco Chemical Company, Chattanooga, Tennessee.
[d]Copolymer 1A was prepared as described for copolymer 1 of Table I, except the initiator contained 10.8% hydrogen peroxide, 4.5% sodium persulfate and 5.6% ferrous ion, on a monomer weight basis.

In interpreting the data of Table II, it should be noted that the critical parameter is the percent adherent, i.e., the level of calcium carbonate which would adhere to the particular substrate of interest. The percent adherent should be as low as possible. It is preferred that the percent calcium carbonate in the filtrate be as high as possible to provide for efficient removal of calcium from the system before the calcium carbonate crystals are formed. However, the amount of calcium in the filtrate may be lower, provided that at the same time the percent calcium carbonate crystals retained on the membrane is higher, indicating greater dispersancy of formed crystals. The dispersed crystals may be removed via conventional means, which would be apparent to one skilled in the art of water treatment.

The results show that the copolymers of this invention comprising a nonionic monomer (e.g., acrylamide) provided better threshold inhibition, dispersancy and scale inhibition than a 50/50 molar ratio maleate/acrylate copolymer and the commercial polymer controls. The 50/50 molar ratio maleate/acrylate copolymer having a molecular weight of 2,672 showed acceptable levels of calcium carbonate inhibition and was superior to the commercial controls (i.e., acrylate/maleate at a weight of 4,500, the Sokalan polymers and polyacrylate). Such enhanced performance was observed under high electrolyte and pH conditions. Thus, the copolymers of this invention provide superior efficacy in controlling scale formation in water systems.

EXAMPLE 3

This example illustrates the detergency performance of the polymers of this invention.

| Detergent Formulations | | | |
|---|---|---|---|
| | Detergent A | Detergent B | Detergent C |
| Component | | Percent by Weight | |
| Soda Ash[a] | 50.0 | 79.0 | 5–50.0 |
| Sodium Silicate | 7.5 | 5.0 | 5.0 |
| Carboxymethyl Cellulose Ether[b] | 0.9 | 0.2 | 0.2 |
| Sodium Alkylbenzene Sulfonate[c] | 7.5 | 8.0 | 8.0 |
| Neodol 25-9[d] | 7.5 | 3.0 | 3.0 |
| Zeolite[e] | — | — | 0–25.0 |
| Sodium Sulphate | 26.6–20.6 | — | — |
| Polymer as indicated | 0–6 | 0–6.0 | 0–4 |

[a]Sodium carbonate, technical grade.
[b]Sodium salt (CMC7LT) obtained from Hercules Chemical, Wilmington, Delaware.
[c]Obtained from Vista Chemicals, Hammond, Indiana
[d]$C_{12}$ to $C_{15}$ linear primary alcohol ethoxylate obtained from Shell Chemical, Houston, Texas.
[e]Zeolite A EZA ® (99% zeolite A), obtained from Ethyl Corporation, Baton Rouge, Louisiana.

DETERGENCY TESTS

A. Calcium Carbonate Deposition on Cotton Fabric

All components of a powdered detergent formulation (Detergent A, shown above), except the experimental polymer, were mixed together and blended in a Waring blender. A 10% solution or dispersion of the dry blended detergent was prepared, and treated with polymer solution.

Water was adjusted to the desired level of hardness with a 4:1 molar ratio of calcium to magnesium ions ($CaCl_2$ and $MgSO_4.7H_2O$) in distilled water.

Samples containing 700 ml of hard water were charged to the Terg-o-tometer (U.S. Testing Co.) buckets at the temperatures noted in the Tables below, and 17.78 cm×17.78 cm (7"×7") cotton percale sheeting swatches (approximately 15 g) were submerged in the water. The 10% solutions of the detergent formulations to be tested were then added. The buckets were agitated at 80 RPM for 20 minutes, and then drained until approximately 70 ml of the wash liquor remained with the swatches. An additional 630 ml of hard water were added to the swatches and water in the buckets and the buckets were agitated for 5 minutes. The swatches were removed from the rinse water, wrung to approximately 100% water pickup, and air-dried. This procedure was repeated 4 more times, for a total of 5 cycles.

The amount of calcium carbonate deposited on the swatches was determined after the fifth cycle. Samples measuring 7.62 cm×7.62 cm (3"×3") and weighing approximately one gram were cut from the washed fabric, and weighed to the nearest 0.01 g. The swatches were each placed in 20 ml of 5% acetic acid and held at 80° C. for 30 minutes. The liquid was decanted, and the swatches were washed with two 5 ml portions of 1% acetic acid, combining the washings with the decanted liquid. The decanted liquid was brought to pH 10 with concentrated ammonium hydroxide and titrated with 0.01M ethylene diamine tetracetic acid (EDTA) using Eriochrome Black T as the indicator (red to blue). The percent deposited $CaCO_3$ on the weight of the fabric was calculated as:

$$\%CaCO_3 OWF = \frac{ml\ EDTA \times molarity\ EDTA \times 10}{g\ sample}$$

B. Redeposition of Clay Soil

Detergent solutions and water samples were prepared as above. The soil was a 4:1 blend of red art clay and black iron oxide.

The fabrics included were cotton percale, 50:50 polyester:cotton percale, and 100% polyester. Eight 7.62 cm×7.62 cm (3"×3") swatches of each fabric were included in each test. The total weight of the swatches was about 16 g.

A liter of water was charged to the Terg-o-tometer bucket at 25° C., and the appropriate level of diluted detergent was added, followed by 0.40 g of the clay soil mixture. The swatches described above were premoistened and added to the buckets. They were agitated for 10 minutes at 80 RPM, the water was drained from the swatches, and one liter of rinse water was added. The buckets were agitated for five minutes more, and the swatches were wrung and air-dried. The procedure was repeated four more times, for a total of five cycles.

The reflectance of the swatches on the "y" scale was determined on four thicknesses of fabric with a Hunter PC-2 Delta Reflectometer. Adequate numbers of measurements were taken to assure statistical significance. Results were reported as % reflectance, with higher number representing less redeposited soil.

C. Detergency

Detergent solutions and water were prepared as above. The soiled swatches were purchased from Scientific Services in Oakland, New Jersey. They included Dust-sebum soiled durable press and Ground-in-clay soiled durable press. The reflectance of the soiled swatches was measured on the "y" scale with a Hunter PC-2 Delta reflectometer on a single thickness of cloth. Four measurements were taken on each swatch and the results were averaged.

One liter of water was charged to the Terg-o-tometer buckets at 25° C., and the appropriate level of diluted detergent was added, followed by three each of the soiled swatches described above. The buckets were agitated for 10 minutes at 80 RPM, the water was drained from the swatches, and one liter of rinse water was added. The buckets were agitated for 5 minutes more, and the swatches were wrung and air dried.

The reflectance of the swatches after the wash cycle was determined on a single thickness of the test swatches, as described for the unwashed swatches. The difference between the reflectance before and after laundering was determined and reported. Larger differences mean more soil was removed.

Part A

The copolymers of this invention were tested for cobuilder efficacy (inhibition of calcium deposition on fabric) in phosphate-free detergent formulations. Results are shown in Tables III, IV and V below.

TABLE III

Calcium Deposition/Detergent Tests

| Detergent A Formulation Polymer[a] | Monomer Composition and Mole % | Polymer Mw | % Polymer in Detergent 6% % CaCO3 OWF[c] | 0% | 4% |
|---|---|---|---|---|---|
| Copolymer 13 | Acrylic Acid/Maleic Acid/Acrylamide 45/50/5 | 3063 | 0.72 | | 1.20 |
| Copolymer 9 | Acrylic Acid/Maleic Acid/N-Vinyl-2-Pyrrolidone 45/50/5 | 2639 | 0.74 | | 1.52 |
| Copolymer 10 | Acrylic Acid/Maleic Acid/Diallylamine 45/50/5 | 2990 | 0.81 | | 1.37 |
| Copolymer 11 | Acrylic Acid/Maleic Acid/Hydroxypropylacrylate 45/50/5 | 2698 | 0.76 | | 1.18 |
| Copolymer 3 | Acrylic Acid/Maleic Acid 50/50 | 2672 | 0.82 | | 1.41 |
| Sokalan ® CP-5[b] | Acrylic Acid/Maleic Acid | 18600 | 1.32 | | |
| Sokalan ® CP-7[b] | Acrylic Acid/Maleic Acid | 14000 | 1.37 | | |
| Sokalan ® CP-45[b] | Acrylic AcidlMaleic Acid | 22900 | 1.15 | | 1.58 |
| No Polymer (control) | | | | 1.32 | |
| Copolymer 2A[d] | Acrylic Acid/Maleic Acid 66/33 | 6580 | 0.99 | | 1.46 |
| Copolymer 12A[e] | Acrylic Acid/Maleic Acid/Methacrylate 45/50/5 | 2400 | 0.75 | | 1.44 |
| Copolymer 7 | Acrylic Acid/Maleic Acid/Acrylamide 49/50/1 | 2700 | 0.77 | | 1.19 |
| Copolymer 8 | Acrylic Acid/Maleic Acid/Acrylamide 35/50/15 | 2830 | 0.77 | | 1.34 |

TABLE III-continued

Calcium Deposition/Detergent Tests

Detergent A

| Formulation Polymer[a] | Monomer Composition and Mole % | Polymer Mw | % Polymer in Detergent 6% % CaCO3 OWF[c] | 0% | 4% |
|---|---|---|---|---|---|
| Copolymer 1B[f] | Acrylic Acid/Maleic Acid/Acrylamide 40/50/10 | 2400 | 0.79 | | 1.19 |
| Copolymer 1C[g] | Acrylic Acid/Maleic Acid/Acrylamide 45/50/5 | 5050 | 1.23 | | 1.49 |
| Copolymer 15 | Maleic Acid/Acrylamide 70/30 | 2698 | 0.82 | | 1.50 |
| No Polymer (control) | | | | 1.32 | |

[a]Experimental polymers are described in Table I and Example 1, above.
[b]Commercial acrylate polymers obtained from BASF Corporation, Parsippany, New Jersey.
[c]The % CaCO$_3$ OWF is the percent calcium carbonate deposited on the weight of the fabric. The tests were conducted with 200 ppm water hardness ion, 50° C. wash and rinse, 0.15% detergent and a ratio of water to cloth of 50:1.
[d]A second batch of copolymer 2, Table I, was synthesized using 3% hydrogen peroxide and 1.9% persulfate, on a monomer weight basis.
[e]A second batch of copolymer 12, Table I, was synthesized using methacrylate in place of acrylamide.
[f]A second batch of copolymer 1, Table I, was synthesized using 10 mole percent acrylamide.

TABLE IV

Calcium Deposition/Detergent Tests

Detergent B

| Formulation Polymer[a] (% in Detergent) | Monomer Composition[d] and Mole % | Polymer Mw | % CaCO3 OWF[f] | Water Hardness (ppm) |
|---|---|---|---|---|
| none | — | — | 1.17 | 150 |
| Copolymer 1 (1%) | MA/AA/AM | | 0.89 | 150 |
| Copolymer 1 (2%) | | | 0.47 | 150 |
| Copolymer 1 (4%) | | | 0.19 | 150 |
| none (control) | — | — | 1.78 | 200 |
| Sokalan ® CP-5[b] (4%) | Acrylic Acid/Maleic Acid | 18600 | 1.13 | 200 |
| Sokalan ® CP-7[b] (4%) | Acrylic Acid/Maleic Acid | 14000 | 1.41 | 200 |
| Sokalan ® CP-45[b] (4%) | Acrylic Acid/Maleic Acid | 22900 | 1.27 | 200 |
| Copolymer 1 (4%) | MA/AA/AM 50/45/5 | | 0.41 | 200 |
| none (control) | — | — | 1.61 | 250 |
| Copolymer 1 (4%) | MA/AA/AM 50/45/5 | | 0.96 | 250 |
| Copolymer 1 (6%) | | | 0.71 | 250 |

[a]Experimental polymers are described in Table I and Example 1, above.
[b]Commercial acrylate polymers obtained from BASF Corporation, Parsippany, New Jersey.
[c]The % CaCO$_3$ OWF is the percent calcium carbonate deposited on the weight of the fabric. The tests were conducted at the indicated water hardness (4:1 Ca:Mg) using 25° C. wash temperature, 0.15% detergent, 5 cycles and a ratio of water to cloth of 50:1.
[d]MA is maleic acid; AA is acrylic acid; and AM is acrylamide.

TABLE V

Calcium Deposition/Detergent Tests

| Detergent C Formulation Polymer[a] (% in Detergent) | Monomer Composition and Mole % | Zeolite (% in Detergent) | Soda Ash | % CaCO3 OWF[b] |
|---|---|---|---|---|
| none | — | 25 | 5 | 0.21 |
| none | — | 5 | 50 | 1.50 |
| Copolymer 1 | MA/AA/AM | 5 | 50 | 0.17 |

TABLE V-continued

Calcium Deposition/Detergent Tests

| Detergent C Formulation Polymer[a] (% in Detergent) | Monomer Composition and Mole % | Zeolite (% in Detergent) | Soda Ash | % CaCO3 OWF[b] |
|---|---|---|---|---|
| (4%) | 50/45/5 | | | |
| Copolymer 1 | MA/AA/AM | 0 | 50 | 0.19 |
| (4%) | 50/45/5 | | | |

[a]Experimental polymers are described in Table I and Example 1, above.
[b]The % CaCO$_3$ OWF is the percent calcium carbonate deposited on the weight of the fabric. The tests were conducted with 200 ppm water hardness ion, 25° C. wash and rinse temperature, 0.15% detergent and 5 wash cycles.

Copolymers 3a and 3b were synthesized according to the synthesis for copolymer 3, except that copolymers 3a and 3b were prepared at weight average molecular weights of 5362 and 5676, respectively. Copolymers 1c, 13, 3, 3a and 3b were tested for calcium carbonate redeposition according to methods set forth herein above, except that a bleached muslin sheeting swatch was used in place of the cotton percale sheeting swatches. Results are presented in Table VI.

TABLE VI

| Detergent A Formulation Polymer | Polymer Mw | % Polymer in % CaCO$_3$ OWF 6% | 4% |
|---|---|---|---|
| 3 | 2672 | 0.57 | 1.23 |
| 3a | 5362 | 0.86 | 1.46 |
| 3b | 5676 | 0.85 | 1.56 |
| 13 | 3063 | 0.34 | 0.95 |
| 1c | 5050 | 0.78 | 1.41 |

The results show that the copolymers of this invention are more effective at reducing the amount of calcium carbonate deposited on test fabric when compared to commercial polymers or to maleate copolymers containing no nitrogen-containing, nonionic monomer, such as acrylamide. These copolymers represent a significant improvement over known maleic-acrylic copolymers in preventing deposit formation on cotton fabric in soda ash (sodium carbonate) based detergents.

Part B

The copolymers of this invention were tested with soda ash as a substitute for zeolite in phosphate free detergent formulations. The results are shown in Table VII, below.

TABLE VII

Effect of Detergency of Replacing Zeolite with Soda Ash and Copolymer

| Detergent[a] Formulation Percent by Weight | 1 | 2 | 3 | 4 | 5 | 6 | 7 | 8 |
|---|---|---|---|---|---|---|---|---|
| Zeolite A[a] | 0.0 | 0.0 | 0.0 | 10.0 | 10.0 | 20.0 | 20.0 | 25.0 |
| Ca Binding Capacity[b] (mmoles) | 0.0 | 0.0 | 0.0 | 0.4 | 0.4 | 0.8 | 0.8 | 1.1 |
| Soda Ash[c] | 75.0 | 75.0 | 42.5 | 50.0 | 27.5 | 20.0 | 12.5 | 5.0 |
| Ca Binding Capacity[b] (mmoles) | 10.6 | 10.6 | 6.0 | 7.1 | 3.9 | 2.8 | 1.8 | 0.7 |
| Copolymer 13[d] | 0.0 | 5.0 | 5.0 | 3.0 | 3.0 | 1.0 | 1.0 | 0.0 |
| Ca Binding Capacity[b] (mmoles) | 0.0 | 0.3 | 03. | 0.2 | 0.2 | 0.06 | 0.06 | 0.0 |
| Sodium Silicate | 6.0 | 6.0 | 6.0 | 6.0 | 6.0 | 6.0 | 6.0 | 6.0 |
| Sodium Alkylbenzene Sulfonate[e] | 6.0 | 6.0 | 6.0 | 6.0 | 6.0 | 6.0 | 6.0 | 6.0 |
| Neodal 25-9[f] | 6.0 | 6.0 | 6.0 | 6.0 | 6.0 | 6.0 | 6.0 | 6.0 |
| Detergency[c] Test Results[d] | | | | | | | | |
| Ground-in-Clay | 22.4 | 22.4 | 22.2 | 21.9 | 19.3 | 19.6 | 19.6 | 21.3 |
| Dust-Sebum | 28.1 | 26.8 | 25.2 | 23.4 | 23.4 | 23.5 | 22.2 | 21.9 |

[a]Formulations were powdered laundry detergents containing zeolite and soda ash in amounts shown above. Amounts of builder components were adjusted to yield detergent formulations that are roughly equivalent in raw material cost.
[b]Using 200 ppm water hardness = 2 Milimolar Ca ion concentration.
[c]Tests were conducted by the method described above with 200 ppm water hardness ion, room temperature wash and rinse, 0.15% detergent, one cycle and three Ground-in-clay and three dust-sebum soiled fabric swatches per detergent sample.
[d]Least significant difference at 90% confidence for clay detergency 1.7. Least significant difference at 90% confidence for sebum detergency = 0.8

The results show that the combination of soda ash and the copolymers of this invention (e.g., formulations 3, 4 and 8) is as effective in building detergent efficacy as a zeolite builder (e.g., formulation 8). The copolymer was as effective as soda ash alone or a combination of zeolite and soda ash.

EXAMPLE 4

This example illustrates the utility of the copolymers of this invention as clay dispersants.

An acid washed Kaolin clay slurry was used for comparing experimental copolymers to control polymers (commercially used) as dispersants. The treated clay slurries were tested for Brookfield (low shear) and Hercules (high shear) viscosities and two week stability at elevated temperature (50° C.). The amount of copolymer used to disperse the clay in aqueous slurry was adjusted to give approximately the same initial viscosity in the slurry. Results are shown in Table VII, below.

TABLE VIII

Clay Dispersant Test

| Sample[a] (mol. wt.) | Lbs/ton (Optimum Level)[b] | Brookfield 20 rpm | Sp | pH | Hercules[c] Bob A 1100 rpm (offscale) | After 2 wks @ 50° C. Brookfield 20 rpm | |
|---|---|---|---|---|---|---|---|
| | | | | | | unstirred | stirred |
| Control Polyacrylic Acid (2,500–2,700) | 3.0 | 266 | 1 | 7.0 | 740 rpm | 1440 | 650 |
| Control Acrylic Acid/AMPS ® Copolymer (≦3,000) | 2.5 | 246 | 1 | 7.1 | 905 rpm | 1560 | 440 |
| Copolymer - 13 | 4.0 | 260 | 1 | 6.6 | 695 rpm | 1640 | 520 |
| Copolymer 1 | 4.5 | 256 | 1 | 6.6 | 735 rpm | 1060 | 450 |

[a]Copolymers are described in Example 1, above. The monomer, 2-acrylamide-2-methylpropane sulfonate, was obtained from Lubrizol Corporation, and is sold under the AMPS ® trademark.
[b]The amount of polymer added to the clay was adjusted to give the optimum product viscosity for a 70% solids clay slurry.
[c]The Hercules end point for shear viscosity at 1100 rpm was measured using a Bob A spindle.

The results show that although larger amounts of experimental polymer were required, the experimental polymer gave viscosity profiles and storage characteristics similar to those of the commercially used control polymers. Thus, the copolymers of this invention are useful as clay dispersants.

Now that the preferred embodiments of the present invention have been described in detail, various modifications and improvements thereon will become readily apparent to one skilled in the art. Therefore, the scope and spirit of the invention are to be limited only by the claims, and not by the foregoing specification.

We claim:

1. A detergent composition comprising 0 to 80% soda ash, 5 to 50% surfactant, 0 to 63% builder and a maleate copolymer present in amounts effective to inhibit deposition of water hardness salts, the maleate copolymer having a weight average molecular weight of about 1,000 to 4,000, a residual total monomer content of less than 1%, on a maleate copolymer dry weight basis, and comprising about 50 mole percent of maleate monomer, about 40 to about 50 mole percent of acrylate monomer and about 1 to about 10 mole percent of a nitrogen-containing, nonionic comonomer selected from the group consisting of acrylamide, methacrylamide, ethylacrylamide, propylacrylamide, isopropylacrylamide, N,N-dimethylacrylamide, N,N-diethylacrylamide, N,N-dipropylacrylamide, N-methylolacrylamide and t-butylacrylamide; wherein the maleate copolymer has a Gardner color of not more than 5 and wherein detergent compositions containing the maleate copolymer inhibit deposition of water hardness salts.

2. The detergent composition of claim 1, wherein the maleate monomer is maleic acid, the acrylate monomer is acrylic acid and the nitrogen-containing, nonionic comonomer is acrylamide.

3. The detergent composition of claim 2 comprising 1 to 5 mole percent of the acrylamide.

4. A process for inhibiting deposition of water hardness salts during washing of fabric in hard water, the process comprising using an amount of a detergent composition effective to wash the fabric in hard water, wherein the detergent composition comprises an amount of a maleate copolymer effective to inhibit deposition of water hardness salts during washing of fabric in hard water, the maleate copolymer having a weight average molecular weight of about 1,000 to 4,000, a residual total monomer content of less than 1%, on a maleate copolymer dry weight basis, and comprising about 50 mole percent of maleate monomer, about 40 to about 50 mole percent of acrylate monomer and about 1 to about 10 mole percent of a nitrogen-containing, nonionic comonomer selected from the group consisting of acrylamide, methacrylamide, ethylacrylamide, propylacrylamide, isopropylacrylamide, N,N-dimethylacrylamide, N,N-diethylacrylamide, N,N-dipropylacrylamide, N-methylolacrylamide and t-butylacrylamide; wherein the maleate copolymer has a Gardner color of not more than 5.

5. The process of claim 4, wherein the maleate monomer is maleic acid, the acrylate monomer is acrylic acid and the nitrogen-containing, nonionic comonomer is acrylamide.

6. The process of claim 5 comprising 1 to 5 mole percent of the acrylamide.

* * * * *